Oct. 26, 1926.　　　　　　　　　　　　　　　1,604,626
W. E. YOUNG
LOADER
Original Filed May 22, 1923　　2 Sheets-Sheet 1

Inventor
W. E. Young
By
Lacey & Lacey, Attorneys

Oct. 26, 1926.
W. E. YOUNG
LOADER
1,604,626
Original Filed May 22, 1923    2 Sheets-Sheet 2
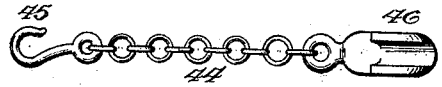
Fig. 2.
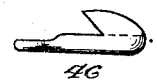
Fig. 3.
Fig. 4.
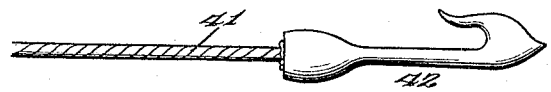
Fig. 5.
Fig. 6.   Fig. 7.
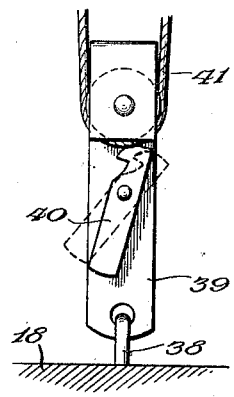 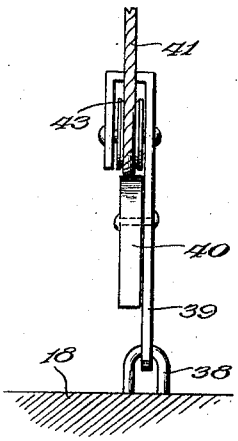
Inventor
W. E. Young
By Lacey & Lacey, Attorneys Patented Oct. 26, 1926.

1,604,626

UNITED STATES PATENT OFFICE.

WILBER E. YOUNG, OF GORDON, NEBRASKA.

LOADER.

Original application filed May 22, 1923, Serial No. 640,729. Divided and this application filed April 5, 1926. Serial No. 99,951.

This application is a division of an application filed by me May 22, 1923, Serial No. 640,729, which eventuated in Letters Patent No. 1,571,880, issued February 2, 1926.

The present invention provides a wagon with implements for placing a considerable portion of a hay stack upon the wagon by one operation instead of loading the same piece meal as is ordinarily the case. The advantage of this feature is that much less time will be spent in loading and unloading the wagons, thereby saving time and labor to quite a considerable extent.

In the annexed drawings:

Figs. 2 and 3 are, respectively, a plan view and an elevation of a detail of the loading device;

Fig. 4 is another detail;

Fig. 5 is a view of a hook forming a part of the loading device;

Figs. 6 and 7 are details of a cable guide and clamp.

Figure 1:
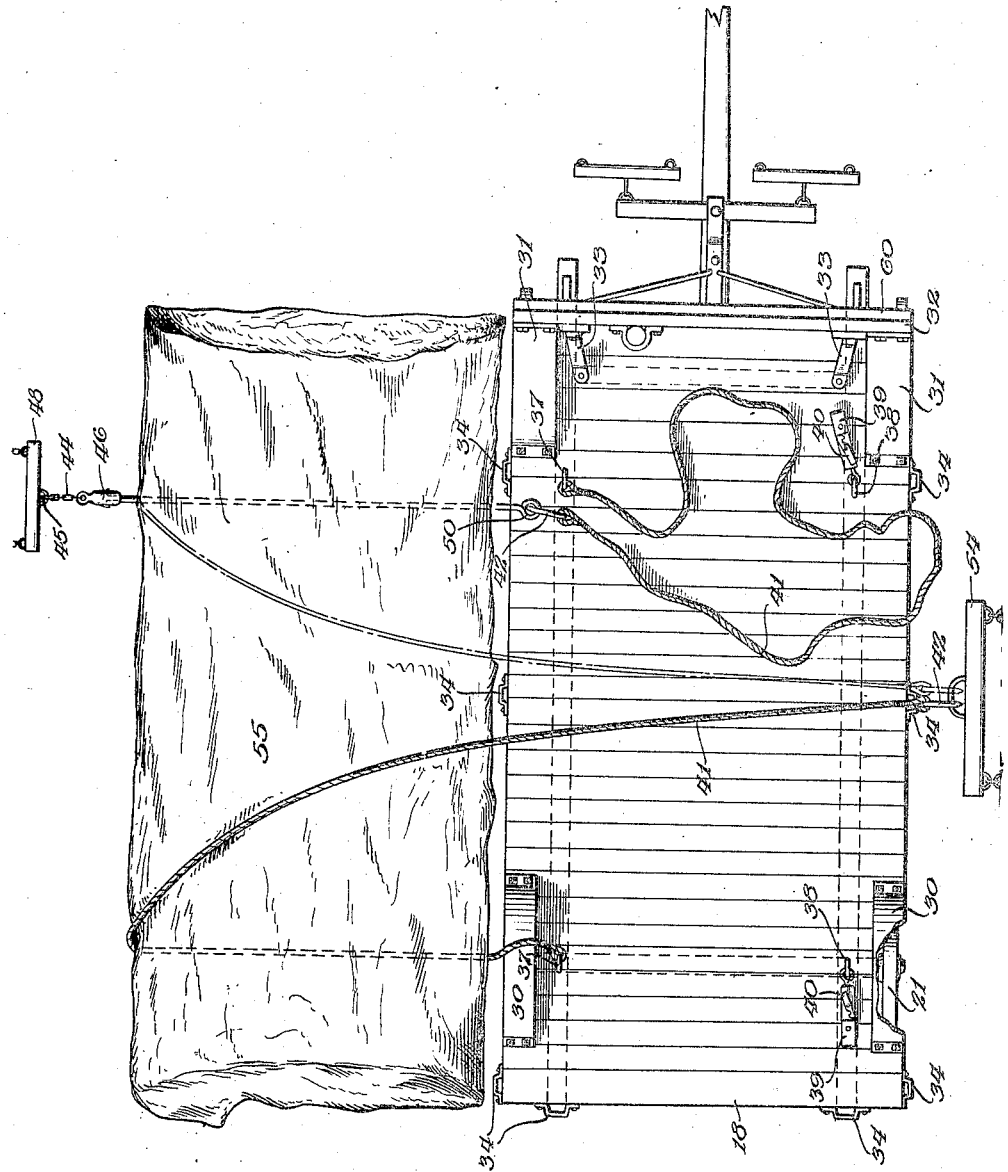
Figure 1 is a plan view showing a wagon beside a hay stack in position to load the stack onto the wagon in accordance with the invention.

The wagon comprises a floor 18 supported on a low running gear which includes ground wheels, one of which is shown at 21. The floor is set directly on the axles of the wheels so as to produce a low structure and facilitate loading.

The wagon wheels are preferably set in a short distance from the side edges of the floor 18, as indicated in Fig. 1, and upon the floor over each wheel is secured a hood 30 and 31 respectively. The hoods 30 for the rear wheels are considerably narrower than the hoods for the front wheels, this greater width of the front hoods permitting the horizontal turning of the wheels under the same.

At the front end of the floor is permanently secured a dash board 60 and a gate 32 braced to the floor as at 33, and along the edges of the floor are furnished staples 34 adapted to receive the lower ends of the racks for carrying stock, such as hogs or sheep, or side boards for the transportation of loose material, such as corn or the like.

In the floor 18 are secured a number of staples 37 and 38, one pair of which is preferably positioned near the front axletree and another pair near the rear axletree. In the staples 38 are fastened small pulley blocks 39 provided with clamps 40 for holding a rope 41, one end of which is secured by the staple 37 and the other end of which is provided with a hook 42. This rope 41 runs over the pulley 43 journaled in the pulley block 39.

In Fig. 2 is shown an adapter link 44 consisting preferably of a chain provided at one end with an open hook 45 and at the other end with a split hook 46. This latter hook is adapted to engage under a spear point 47, and the hook 45 is adapted to engage in the singletree 48. The spear consists of a straight rod 49 terminating with an eye 50 at the end remote from the point 47.

In order to put a load of hay on the wagon, the latter is driven up to the hay stack 55 and the spear 49 is driven through the hay from the wagon side to the opposite side thereof near the forward staple 37 on the wagon. When the spear point 47 projects through the hay, the hook 42 at the end of the rope 41 is attached to the eye 50 at the rear end of the spear, while the double or split hook 46 on the adapter 44 is placed around the projecting spear point 47. The hook 45 is then attached to the clevis of the singletree 48 and a horse is utilized to pull the spear and the greater portion of the rope 41 through the hay at this point. This operation is repeated with the rope 41 at the rear staple 37 and the spear point 47 pulled through the hay in the same manner. When both the front and rear ropes have been drawn through the hay, they are slung over the top thereof and a doubletree 54 is hitched to the two hooks 42 of the ropes 41, and by the use of a pair of horses attached to the doubletree 54, the hay is rolled up onto the floor 18 of the wagon. When in this position, the hay is then tightened down by running the ropes 41 over their respective pulleys 43 on the opposite side of the wagon, and after having been drawn down tight are held in this manner by the clamp 40 in each pulley block 39. The end of each rope is then thrown back across the hay and the hook 42 secured in one of the staples 37 with the ropes running transversely over the load.

In some instances, particularly if the hay is packed very hard, the cable may be passed under the stack instead of through the same and then the loading proceeded with as before.

Having thus described the invention, I claim:

1. In a vehicle having a platform, a hoisting device comprising staples secured along one side of the platform, ropes attached to said staples, a hook at the free end of each rope, pulley blocks for said ropes secured along the opposite side of said platform, and clamping elements on said pulley blocks.

2. In a vehicle having a platform, a hoisting device comprising staples secured along one side of the platform, ropes attached to said staples, a spear removably connected with the free end of a rope, and an adapter for connecting the spear with a source of power and having a split hook engaging the point of the spear.

3. In a traveling hoisting device, a platform, flexible tension members attached to said platform at one side thereof, pulley blocks for said flexible tension members secured along the opposite side of said platform, clamping elements on the pulley blocks and a load-penetrating spear adapted to be attached to said flexible tension members for carrying the same through a load.

4. In a traveling hoisting device, a platform, ropes attached to platform at one side thereof, a hook at the free end of each rope, pulley blocks for said ropes secured along the opposite side of said platform and provided with clamping elements, a load-penetrating spear having an eye adapted to engage with the hook at the free end of either rope, and an adapter engageable with the spear to connect the same with a source of power.

5. In a traveling hoisting device, a platform, staples secured along one side of the platform, ropes attached to said staples, a hook at the free end of each rope, pulley blocks for said ropes secured along the opposite side of said platform and provided with clamping elements, a spear having an eye adapted to engage with a rope hook, and an adapter for connecting the spear point with a source of power, said adapter including a chain and a split hook engaging around the point of the spear.

In testimony whereof I affix my signature.

WILBER E. YOUNG. [L. S.]